United States Patent

[11] 3,621,872

[72] Inventor Walter Fisher
 122 Douglas Shand Avenue, Pointe Claire, Quebec, Canada
[21] Appl. No. 51,054
[22] Filed June 30, 1970
[45] Patented Nov. 23, 1971
[32] Priority Aug. 2, 1968
[33] Canada
[31] 026,593
 Continuation of application Ser. No. 753,675, Aug. 19, 1968, now abandoned. This application June 30, 1970, Ser. No. 51,054

[54] SAFETY VALVE
 8 Claims, 2 Drawing Figs.
[52] U.S. Cl. .................................. 137/494, 137/505.42, 137/614.2
[51] Int. Cl. .................................. F16k 17/04
[50] Field of Search .................................. 137/494, 505.42

[56] References Cited
UNITED STATES PATENTS

| | | | |
|---|---|---|---|
| 2,005,445 | 6/1935 | Wiedhofft | 137/494 X |
| 2,405,010 | 7/1946 | Bucknam | 137/505.42 |

*Primary Examiner*—Harold W. Weakley
*Attorney*—Smart & Biggar

ABSTRACT: A valve assembly for use in systems involving the regulation of pressure from a high-pressure source to a low-pressure or subatmospheric system. The valve assembly comprises a main valve and an auxiliary valve, means biasing the main valve towards a closed position, a diaphragm, one side of which is exposed to working pressure and the other side of which is exposed to a reference pressure, and a valve-operating member engageable with the main valve and movable with the diaphragm between two limiting positions within which the main valve is opened by the operating member or closed under the action of the biasing means. The valve-operating member engages with the auxiliary valve to close the auxiliary valve on movement of the operating member beyond either of the two limiting positions.

PATENTED NOV 23 1971

3,621,872

INVENTOR
WALTER FISHER
BY- Smart & Biggar
ATTORNEYS

3,621,872

SAFETY VALVE

RELATED APPLICATIONS

This application is a continuation of my previous application Ser. No. 753,675, filed Aug. 19, 1968, now abandoned

BACKGROUND OF THE INVENTION

This invention relates to valves of the type employed to control the flow of fluid from a high-pressure source to a low-pressure of subatmospheric system.

The system may be a fuel oil transmission system in which a central reservoir is used to supply oil directly to various surrounding buildings or dwellings. In such a system it is necessary to insert valves in the transmission line inside each building or dwelling in order to reduce the normally high, main line pressure to an acceptable lower value, and in order to regulate the flow of fuel oil to the burner of the building's heating plant. The main line pressure of such installations may range up to about 75 p.s.i. with the pressure-reducing line pressure being reduced to about 4 to 10 p.s.i. for use in conventional oil heating systems.

In systems of the type described above there exists the danger that the fuel control valves will malfunction which could result in fuel oil at relatively high line pressures being introduced directly to the oil burner, thus bursting the burner pump seal, or could result in rupture of the valves or the transmission lines themselves. In either case fuel oil would escape into the building or dwelling being served. While safety features have been incorporated into some known valves, these are usually directed to certain specific areas and do not provide protection against all the defects normally encountered in such systems.

SUMMARY OF INVENTION

It is therefore an object of this invention to provide a relatively simple and inexpensive valve which will stop the flow of fuel therethrough in the event of a variety of malfunctions normally encountered in systems of this type.

The present invention may be incorporated into pressure-reducig valves or differential pressure or demand valves. Normally, a pressure-reducing valve is disposed between the main line and the furnace or fuel burner to reduce the line pressure to usable proportions, with the differential pressure valve being inserted between the pressure-reducing valve and the furnace or burner to regulate the supply of fuel to the furnace or burner.

In a broad aspect this invention contemplates a valve assembly comprising a main valve and an auxiliary valve, means biasing said main valve towards a closed position, a diaphragm, one side of which is exposed to working pressure and the other side of which is exposed to a reference pressure, and a valve-operating member engageable with said main valve and movable with said diaphragm between two limiting positions within which said main valve is opened by said operating member or closed under the action of said biasing means, said valve-operating member engaging said auxiliary valve whereby to close said auxiliary valve on movement of said operating member beyond either of said two limiting positions.

Although the present invention has the particular use stated above, it is not limited to such a system and would be useful in many systems involving the regulation of pressure from a high-pressure source to a lower pressure system.

DESCRIPTION OF PREFERRED EMBODIMENTS

In the accompanying drawings which illustrate embodiments of the invention,

Figures 1, 2:
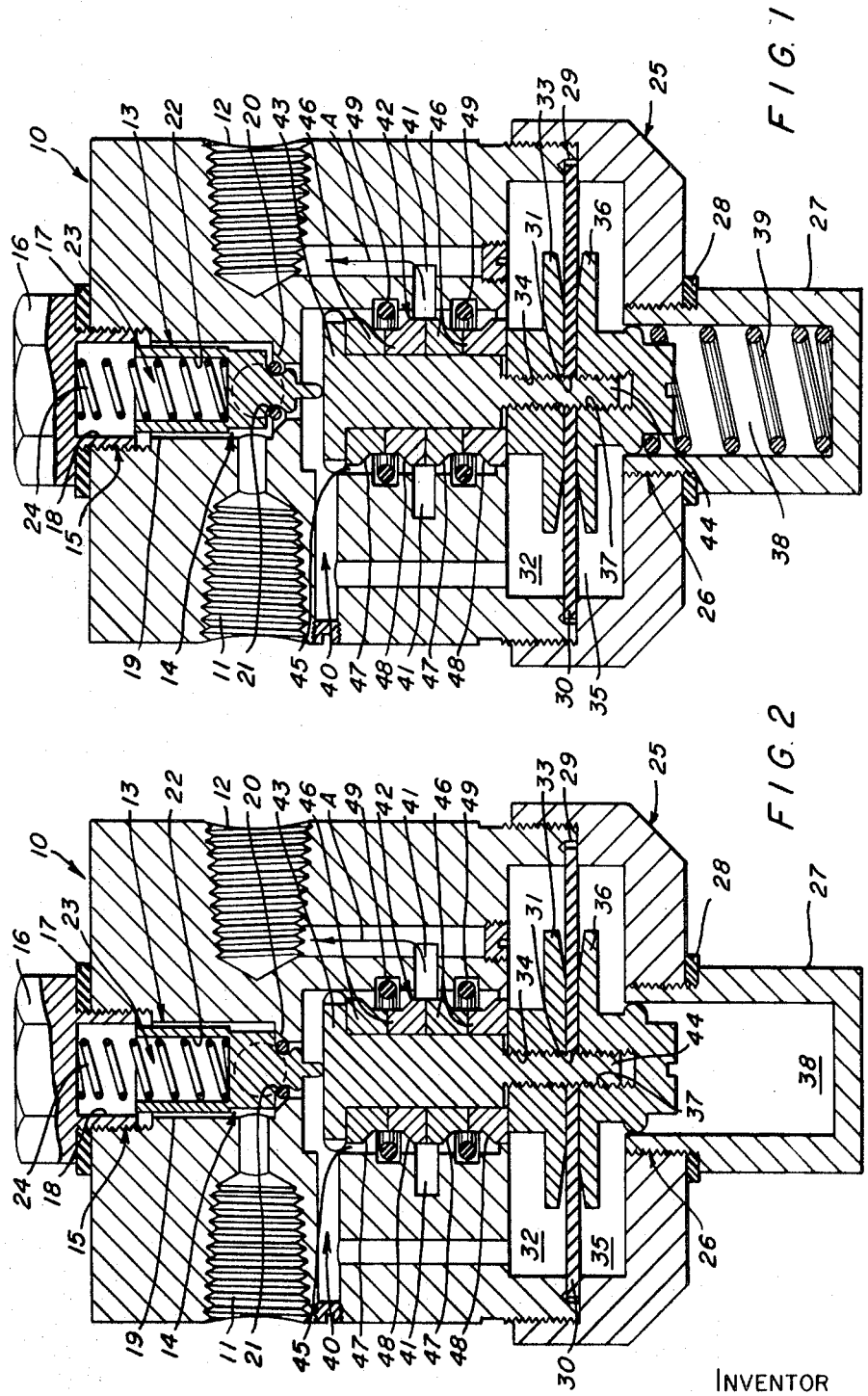
FIG. 1 is an axial section of a pressure-reducing valve.
FIG. 2 is an axial section of a differential pressure-reducing valve.

The valve illustrated in FIG. 1 consists of body 10, provided with internally screw-threaded inlet and outlet openings 11 and 12, respectively, for connection with fuel transmission lines. In the top of the housing there is chamber 13 which houses the man poppet valve 14. Chamber 13 has an internally screw-threaded opening 15 which is closed by an externally threaded sealing cap 16 and a gasket 17, the sealing cap 16 being provided with an axial bore 18.

Poppet valve 14 controls fluid flow through the inlet 11 and consists of a spring-biased poppet 19 and poppet seat 20. One end of poppet 19 carries an O-ring 21 which is adapted to sealingly contact seat 20 to close inlet 11. The other end of poppet 19 is provided with an axial bore 22 which, together with the bore 18, forms a chamber 23, in which valve-biasing spring 24 is housed. One end of spring 24 abuts the end of bore 18 in sealing cap 16 and the other end abuts the end of bore 22 in poppet 19 to bias the poppet toward seat 20.

The bottom of the body is open and externally screw threaded for engagement with an internally screw-threaded cover 25 having an internally screw-threaded central opening 26 sealed by externally screw-threaded magazine 27 and sealing gasket 28. Cover 25, on threaded engagement with the end of the housing, forms annular indenture 29 in which a diaphragm 30 having a central aperture 31 rests. One side of diaphragm 30 and the body form chamber 32 in which there is located piston nut 33 having a central screw-threaded bore 34 aligned with aperture 31 in diaphragm 30. The other side of diaphragm 30 and the interior of cover 25 form chamber 35 which contains guide 36 having an internally screw-threaded bore 37 aligned with aperture 31 in diaphragm 30 and bore 34 in piston nut 33. The bottom of guide 36 and the interior of magazine 27 define a chamber 38 which houses a compression spring 39 which reacts against the bottom of magazine 27 to urge guide 36 and hence diaphragm 30 upwardly.

The interior of the valve body comprises three interconnecting chambers 32, 40 and 41. When the main valve 14 is open, fuel passes through inlet 11 to chamber 40, chamber 32, into chamber 41 and then through the outlet as illustrated by arrow A. The passage of fuel through chamber 41 and the outlet is controlled by 42 located in the passage 45 which connects chambers 32, 40 and 41. The auxiliary valve is in the form of a piston, one end 43 of which abuts the poppet 19 and the other end 44 of which is externally screw-threaded for engagement with the piston nut, diaphragm and piston guide to secure the piston to the diaphragm. The piston carries four annular sleeves 46, the exteriors of which form two sets of upper and lower valve seats 47 and 48 respectively, axially spaced above and below chamber 41. In passage 45, two sealing O-rings 49 are mounted in annular grooves of body 10. The O-rings 49 are adapted to be contacted by either set of valve seats to seal the passage between chambers 32 and 40, and outlet chamber 41.

FIG. 2 illustrates the present invention as a differential pressure valve or demand valve, the only difference in the construction of the differential pressure-reducing valve lies in the elimination of the compression spring 39. The various elements of FIG. 2 are therefore identified by the same reference numerals as the corresponding elements in FIG. 1.

The valves are actually about half the size shown in the drawings. All parts except springs, diaphragm O-rings and gaskets, are preferably made from free-cutting brass. However they could be made from any other suitable material. The O-rings and diaphragm may be made from Viton (trademark) a rubber compound specially designed so as not to swell or be otherwise affected by fuel oil, and the gaskets may be of nylon.

Referring again to the valve of FIG. 1, during normal operation the main or poppet valve 14 is open and held in balance by spring 39 which acts on poppet 19 through the guide, diaphragm, piston nut and piston assembly. The extent to which the line pressure at inlet 11 is reduced will depend upon the characteristics of spring 39. When main valve 14 is open, fuel oil from the line will flow through inlet 11, chamber 40, chamber 32, chamber 41 and outlet 12. The pressure in chamber 32 will exert a force on the upper surface of the diaphragm opposite to the force exerted on the underside by spring 39 and, when the pressure exceeds the permissible maximum, the diaphragm will move down against the action of spring 39, carrying with it auxiliary valve 42 which will result in closure of main valve 14 through the biasing spring 24. When the pressure in chamber 32 is reduced as by the continuation or resumption of flow through outlet 12, the diaphragm will move up under the action of spring 39 and main valve 14 will be reopened to permit the resumption of flow through inlet 11. Throughout this normal operation of the pressure-reducing valve the auxiliary valve 42 will remain open and unseated.

If there is a failure in the main valve, either by poppet 19 being jammed in open position by the presence of dirt on the valve seat 20, or damage to the O-ring 21, the fuel will first flow unrestricted into chambers 40, 32 and 41 and increase the pressure on the diaphragm until the diaphragm and piston have moved downwards and the upper valve seats 47 of the auxiliary valve make contact with O-rings 49. Under these conditions, chamber 41 and the outlet 12 will be isolated from chambers 40 and 32 and no further flow will take place.

If the diaphragm fails to function due to a puncture or rupture, the pressure in chambers 32 and 35 will equalize, removing the force-opposing spring 39. Consequently, the main spring will move the auxiliary valve-upwards until the lower valve seats 48 contact the O-rings 49 and prevent any further flow into chamber 41 and the outlet 12.

If there is a failure in the main spring and the force of the main spring is eliminated, the fuel pressure in chamber 32 will force the diaphragm and piston downwards, allowing the main valve 14 to close by seating O-ring 21 on valve seat 20, thus stopping the flow of fuel into chambers 40, 32 and 41.

In operation, the valve of FIG. 2 differs from the valve of FIGS. 1 in that the main valve 14 is normally closed under the action of biasing spring 24 and reduced pressure owing to the absence of compression spring 39. When a demand is created at outlet 12, as by the operation of an oil furnace burner pump, fuel will be drawn from the valve chambers 41, 40 and 32 to create a vacuum. When the vacuum reaches a certain value for example 2 to 3 inches of mercury, the air contained in chamber 35 and 38 which is at trapped atmospheric pressure, will act on the underside of the diaphragm to move the auxiliary valve upwards and unseat O-ring 21 from the valve seat 20 against the action of biasing spring 24. Fuel will then flow into chambers 40, 41 and 32, will until a balance is reached between the air pressure in chamber 35 and 38, the pressure in chamber 32 and the force of biasing spring 24. After the demand has ceased, fuel will continue to flow to reduce the vacuum and move auxiliary valve 42 downwards, allowing the O-ring 21 to reseat on the valve seat 20. Again, under normal operating conditions the auxiliary valve will remain open.

If there is a failure in the main valve, for example, if the poppet is jammed in open position due to the pressure of dirt on the valve seat or the O-ring is damaged, fuel at a pressure set by the pressure-reducing valve will freely flow into chambers 40, 41 and 32 and oppose the trapped atmospheric air pressure in chamber 35 to force the auxiliary valve downwards until seats 47 contact O-rings 49. This will isolate chamber 41 form chambers 40 and 32 and stop further flow.

If there is a failure in the diaphragm, the trapped air in chamber 35 and 38 will escape into chambers 32, 40 and 41 and fuel will flow in reverse until equilibrium is established between the pressure or vacuum on the top and the underside of the diaphragm and O-ring 21 will remain seated or be seated by the upstream oil pressure and the force of biasing spring 24.

What I claim as may invention is:

1. A valve assembly comprising a main valve and an auxiliary valve, means biasing said main valve toward a closed position, a diaphragm one side of which is exposed to working pressure and the other side of which is exposed to a reference pressure, and a valve-operating member engageable with said main valve and movable with said diaphragm between two limiting positions within which said main valve is opened by said operating member of closed under the action of said biasing means, said valve-operating member engaging said auxiliary valve whereby to close said auxiliary valve upon movement of said operating member to either of said two limiting positions.

2. A valve assembly comprising:
 a. a chamber adapted to fluid flow therethrough,
 b. a main valve for controlling fluid flow into said chamber, means biasing said main valve toward a closed position,
 c. an auxiliary valve for controlling fluid flow out of said chamber, and having a first closed position, an intermediate open position and a second closed position,
 d. a diaphragm closing one end of said chamber one side of which is exposed to working pressure and the other side of which is exposed to a diaphragm biasing means, and
 e. a valve operating member engageable with said main and auxiliary valves and movable with said diaphragm whereby to move said auxiliary valve to said open position or to one of said closed positions in response to variations in pressure on said diaphragm and whereby to open said main valve against the action of said main valve biasing means or release said main valve for closure by said main valve biasing means.

3. A valve assembly defined in claim 2 wherein said main valve comprises a poppet and a poppet seat and said main valve biasing means comprises a spring acting on one side of said poppet to urge said poppet against said seat, said operating means being engageable with the other side of said poppet to urge said poppet away from said seat.

4. A valve assembly as defined in claim 2 wherein said auxiliary valve comprises two axially spaced annular seats, two double-acting valve members each engageable with one of said seats upon movement of a predetermined distance in either direction, and an outlet from said chamber disposed between said seats.

5. A valve assembly as defined in claim 2, wherein said auxiliary valve comprises two axially spaced annular seats, an outlet from said chamber disposed between said seats, and two double-acting valve members mounted on said valve-operating member, each of said valve members being engageable with one of said seats upon movement of a predetermined distance in either direction whereby to close said outlet.

6. A valve assembly as defined in claim 2, wherein said diaphragm-biasing means comprises a compression spring acting against one side of said diaphragm.

7. A valve assembly as defined in claim 2, wherein said diaphragm-biasing means is atmospheric pressure acting on said diaphragm outside of said chamber.

8. A valve assembly comprising a chamber adapted to fluid flow therethrough, a main valve controlling fluid flow out of said chamber consisting of a poppet valve and seat therefore, means resiliently biasing said poppet valve towards said seat, an auxiliary valve arranged to control fluid flow from said chamber consisting of two annular valve seats disposed in axial alignment with the seat of said main valve and two double-acting valve members, each engageable with one of said annular seats upon movement of a predetermined distance in either direction, a diaphragm closing one end of said chamber and having one side exposed to working pressure and the other side exposed to biasing means, a valve operating member engageable with said poppet and movable with said diaphragm between two limiting positions within which said poppet is spaced from said poppet seat or urged against said poppet seat under the action of said poppet valve biasing means, said valve-operating means carrying said double-acting valve members whereby to urge said double-acting valve members against said annular valve seats upon movement of said operating member to either of said two limiting positions.

* * * * *

UNITED STATES PATENT AND TRADEMARK OFFICE
CERTIFICATE OF CORRECTION

PATENT NO. : 3,621,872
DATED : November 23, 1971
INVENTOR(S) : Walter Fisher

It is certified that error appears in the above-identified patent and that said Letters Patent is hereby corrected as shown below:

In the heading of the above identified patent please insert the following:

-- [73] Assignee: TEXACO CANADA LIMITED, Montreal, Quebec, Canada --.

Signed and Sealed this

Twenty-first Day of May 1985

[SEAL]

Attest:

DONALD J. QUIGG

*Attesting Officer*     *Acting Commissioner of Patents and Trademarks*